United States Patent [19]

Yokota

[11] 4,330,202
[45] May 18, 1982

[54] RANGE DETECTING DEVICE

[75] Inventor: Hideo Yokota, Tokyo, Japan

[73] Assignee: Canon Kabushiki Kaisha, Tokyo, Japan

[21] Appl. No.: 101,648

[22] Filed: Dec. 10, 1979

[30] Foreign Application Priority Data

Dec. 11, 1978 [JP] Japan .................. 53-153370

[51] Int. Cl.³ .................. G01C 3/10; G01C 5/00; B29D 13/18; G03B 7/08
[52] U.S. Cl. ....................... 356/1; 350/432; 354/25
[58] Field of Search ............. 350/189; 356/1, 4; 354/25

[56] References Cited

U.S. PATENT DOCUMENTS

| 3,443,502 | 5/1969 | Harvey | 356/1 |
| 3,519,829 | 7/1970 | Pradel et al. | 356/4 |
| 3,813,679 | 5/1974 | Hasegawa | 354/25 |
| 3,820,129 | 6/1974 | Hosoe et al. | 354/25 |
| 4,091,275 | 5/1978 | Wilwerding | 354/25 |

OTHER PUBLICATIONS

Jenkins and White, Fundamentals of Optics, Third Ed., Chapter 9, 1957.

Primary Examiner—S. C. Buczinski
Attorney, Agent, or Firm—Toren, McGeady and Stanger

[57] ABSTRACT

The disclosed range detecting device includes a light emitting source and a first lens system including a number of lens surfaces for projecting a light beam from the source toward an object whose distance from the device is to be measured. A second lens system receives light reflected from the object, and a sensing device provides a signal corresponding to the light received by the second lens system. At least one of the lens surfaces of the first lens system is aspherical, so that the cross section of the reflected light beam impinging on the sensing device is such as to provide a well defined output signal from the device.

2 Claims, 27 Drawing Figures

FIG.6A  FIG.6B  FIG.6C
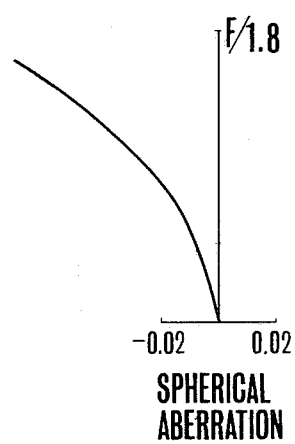
SPHERICAL ABERRATION
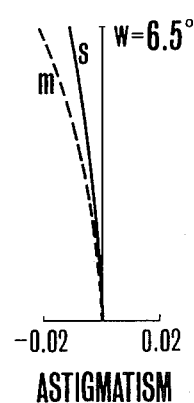
ASTIGMATISM
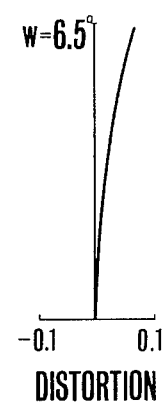
DISTORTION
FIG.6D
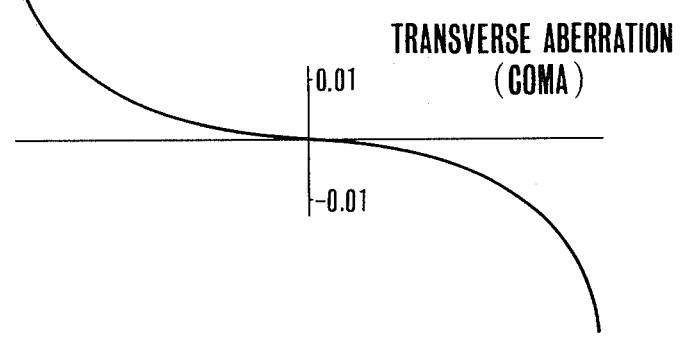
TRANSVERSE ABERRATION (COMA)

SPHERICAL ABERRATION

ASTIGMATISM

DISTORTION

COMA

SPHERICAL ABERRATION

ASTIGMATISM

DISTORTION

COMA

F/1.8
−0.02  0.02
SPHERICAL ABERRATION w=6.5°
−0.02  0.02
ASTIGMATISM w=6.5°
−0.1  0.1
DISTORTION w=5.2°
COMA

F/1.8
−0.02  0.02
SPHERICAL ABERRATION w=6.5°
−0.02  0.02
ASTIGMATISM w=6.5°
−0.1  0.1
DISTORTION w=5.2°
COMA

RANGE DETECTING DEVICE

BACKGROUND OF THE INVENTION

This invention relates to a range detecting device which detects or measures a distance between an object and the device. Various types of range detecting devices for enabling automatic or semi-automatic focus adjustment of camera lenses are conventionally known, and they are generally classified as passive or active types. The passive type has merit in that the mechanism is simple, but it has a disadvantage in that range detection is difficult when the scene is dark.

However, the active type of detecting devices projects the light from the device toward the object, and the reflected light is sensed, so that the disadvantage of the passive type devices is not present in this type. A camera having this active type of a range detecting devices is disclosed in U.S. Pat. No. 3,443,502.

In cameras using active devices such as the type shown in U.S. Pat. No. 3,443,502, a light source emits a beam which is moved angularly to sweep the field of the camera lens. The angular motion of the beam is linked to and calibrated with concomitant motion of the lens-focus-adjustment. A sensor is positioned to receive light reflected from the object, and, upon receiving this reflected light, the displacement of the focus-adjustment is arrested, thus positioning and holding the camera lens at the correct range adjustment.

In range detecting devices of the active type mentioned above when the light sensor fully receives the reflected light from the object and produces a signal of high intensity, the camera lens is at the correct range adjustment, and when the light sensor does not receive the reflected light and produces a signal of low intensity, the camera lens is not at the correct range adjustment. Therefore, for increasing the accuracy of the range detection, it is desirable that the sensor have a small displacement from the position of the beam which produces a low output signal to the position of the beam which produces a high output signal, namely, that the intensity of the sensor output signal vary definitively from a low state to a high state while the beam emitted from the light source is angularly moving to sweep the field of the camera lens.

It has been also desired to increase the maximum detectable distance that the active type range detecting device may detect between the object and the device.

SUMMARY OF THE INVENTION

One of the objects of the present invention is to provide a range detecting device wherein the maximum distance which can be detected between the object and the device is increased, and having a high degree of accuracy of range detection.

Contrary to the passive type of range detecting device, the aberrational performance of a projecting lens system for projecting light from a light source to an object as well as that of the receiving lens system for gathering the reflected light from the object, is an important factor for the active type of range detecting device.

For increasing the maximum detectable distance, it is desirable (1) that the projecting lens system have a relatively large aperture so as to increase the amount of light projected onto the object, and (2) that the receiving lens system have a relatively large aperture so as to increase the amount of light received.

Also, for enhancing the distance detection accuracy, it is desirable (3) that the contour of the light flux projected on the object be made clear, and (4) that a good image of an illuminated area on the object be formed on the sensor so as to produce a well defined change in its output signal.

Therefore, another object of the present invention is to provide a range detecting device having a lens system satisfying the above conditions for optimum range detection.

It is possible to increase the relative aperture and correct the aberrations if each of the lens systems is made of a plurality of lenses. However, as mentioned above, the active type of range detecting device has two lens systems, so that the device as a whole would not be compact and would become heavy, so as to be unsuitable for incorporation in a handy camera.

Therefore, still another object of the present invention is to provide a range detecting device having an extended maximum detectable distance, a high degree of detection accuracy, and which is light weight and compact.

BRIEF DESCRIPTION OF THE DRAWINGS

FIGS. 6A to 6D show various aberrations of a single lens having spherical surfaces.

DETAILED DESCRIPTION OF THE PREFERRED EMBODIMENT

Figure 1:
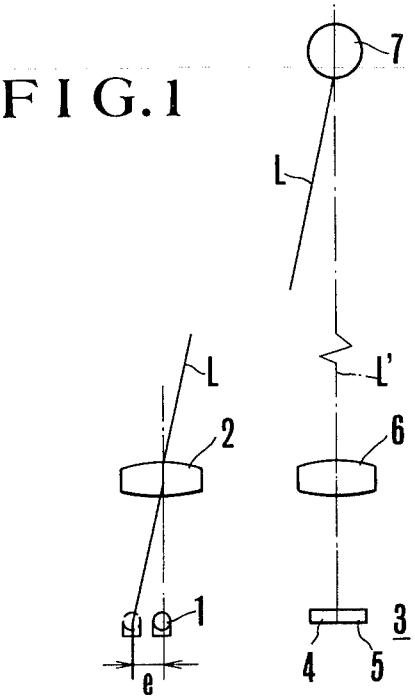
FIG. 1 is a schematic view of a range detecting device of the differential type.

In FIG. 1, a range detecting device includes a light emitting source 1 which is also an illumination light source. A light emitting diode is preferably used as the light emitting source 1. When the light emitting diode is used, it is possible to make the light emitting portion smaller, and without using any mask as an indicating member. The light emitting diode itself can be used as an indicating mark, and it is particularly unnecessary to correct the chromatic aberration because good monochromaticity of emitted light is obtained.

A visible light or an infrared light may be emitted, but in the case of an ordinary camera infrared light is used so as to avoid the appearance of the portion illuminated by the emitted light in the photograph. If a light emitting diode which emits a light having a wave length which is not sensed by the film is used, it is not necessary to synchronize the shutter opening and closing with the illumination and darkening of the diode in the camera. The projection lens 2 functions to converge the light flux from the light emitting source 1. A photo-electric conversion element 3 has sensors 4 and 5 arranged side to side, and a light receiving lens 6 has an optical axis L' which coincides with the border of the sensors 4 and 5. The optical axis L' is spaced apart from optical axis L" of the projecting lens 2 by a suitable length, the so-called base length.

The light flux from the light source 1 is refracted and converged by the projection lens 2 and projected on the surface of the object 7, and the light flux which is dispersed and reflected by the object 7 is converged on the light receiving surface of the photo-electric conversion element 3 by the light receiving lens 6.

As the light emitting source 1 moves along the focal plane of the projecting lens 2, the central light beam of the projected light moves angularly. Instead of moving the light emitting source 1, it is possible to move the light beam angularly by arranging a reciprocatingly rotating mirror, or a variable optical wedge between the projecting lens 2 and the light emitting source 1.

When the light source 1 is moved from the optical axis L" of the projecting lens 2 by the movement amount e, the central light beam L is inclined as shown.

Figure 2:
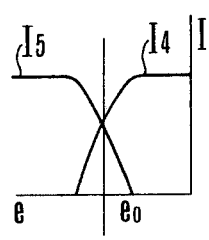
FIG. 2 shows output signals from a light sensing element of the device of FIG. 1.

When the light source 1 is moved, the center of the reflected light beam incident on the light receiving surface of the element 3 moves, and the output electrical signals of the sensors 4 and 5 change as shown in FIG. 2. When $I_4=I_5$, there exists $\theta_0$ which depends on the object distance, so that this condition can be used as a distance detecting signal to compute the object distance.

Figure 3:
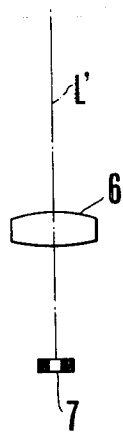
FIG. 3 is a schematic view of a range detecting device of the peak detecting type.
Figure 4:
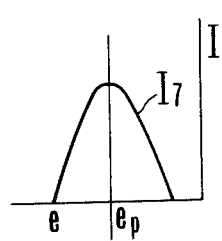
FIG. 4 shows the output signal from a light sensing element of the device of FIG. 3.

The foregoing description has been made in connection with a differential type of light receiving system. A peak detection type of light receiving system is shown in FIG. 3, in which a light receiving element 7 is arranged that its center coincides with the optical axis L'. In this case too, the output of the element 7 depends on the amount of movement e of the light source 1 (See FIG. 1) and has characteristics as shown in FIG. 4. Thus, the object distance is computed upon detection of ep, which is the peak value of the output of the element 7.

Figure 5:
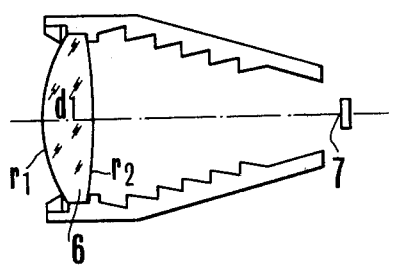
FIG. 5 shows cross sections of a lens system and lens barrel.

According to the above embodiment of the range detecting device, the projecting lens 2 and the light receiving lens 6 are each a single lens without correction for chromatic aberration, and are made of a synthetic resin, such as polymatemethaacrylate. In FIG. 5, a lens barrel holds light receiving lens 6 in front of the light receiving element 7.

As it is desired that the lens system used in the range detecting device be simple, compact and light, a fewer number of component lenses is preferred and a single lens for each system is most preferred.

However, as mentioned above, it is important that the lens system used in the device according to the present invention have a relatively large aperture and a satisfactorily corrected aberration for achieving the object of the present invention.

Among various aberrations, spherical aberration is known to have the most adverse effect on distance detection or measurement. When a projecting lens or receiving lens having relatively bad spherical aberration is used, it is often impossible to detect the object distance. Thus, when a lens system with bad spherical aberration is used, the reflected light beam incident on the light receiving element forms an image having much flare or skirts, thus lowering the Signal-to-Noise ratio. More specifically, the intensity distribution across the cross section of the light beam has a plurality of maxima so that it is difficult to detect the changing point $e_0$ in FIG. 2, or the peak value ep in FIG. 4.

Even if efforts are made for minimizing the spherical aberration by designing a single lens, the aberration corresponding to the infinite distance object point of the lens having normalized focal length f=1 is as shown in FIGS. 6A–6D, and even if the relative aperture of the light receiving lens is increased, the illumination of the image of the distance detecting light beam on the light receiving element cannot be effectively improved.

Also, even if the relative aperture of the projecting lens is increased, it only increases the flare, and no effective increase in the light level can be expected. In order to eliminate the problems of spherical aberration, and to eliminate the problems of coma aberration, an aspherical surface having its curvature gradually decreasing from the optical axis (lens vertex) toward the marginal portion of the surface is introduced in the lens systems of the present invention.

By the introduction of the aspherical surface, it is possible to increase the amount of light simultaneously with a relative increase of the aperture.

In this way, the accuracy of the distance detection, and the maximum detectable distance can both be increased.

Although the advancing direction of the distance detection light beam relative to the projection lens is opposite the beam advancing direction relative to the light receiving lens, both lenses are considered to be equivalent with respect to the object and the light source or sensing element. Therefore, a lens optimum to the light receiving optical system is also optimum to the light projecting optical system, and at least one aspherical surface is introduced into one or both of the projecting and receiving lens systems.

As both of the projecting lens and the receiving lens are assembled within a camera, it is impossible for both focal lengths of the lenses to differ greatly from one another, and the distance from the object to the principal point of either lens is much longer than the focal length of the lens. Therefore, the receiving element and the projecting element composed of a light source and an indicating mark are placed near the focal point position in order to obtain clear images of projected light and received light. When the magnifications of the projection optical system and the receiving optical system are measured along the direction from the object to the elements, the absolute values are far smaller than 1 and they are considered to be equivalent relative to the aberration correction.

In the case of a single lens having an aspherical surface, the spherical aberration and the coma aberration are influenced by the bending of the lens surfaces $R_1$ and $R_2$ (FIG. 5), and by the aspherical coefficients. However, in the case of the present invention where the principal point of the lens and the pupil are arranged almost at the same position, the astigmatism and the distortion are not substantially influenced by the bending and the change of aspherical coefficients.

The spherical aberration can be corrected by introduction of an aspherical surface, unless the absolute value of S of the formula $S=f\cdot(1/R_1+1/R_2)$ relative to the lens shape for reducing the spherical aberration is very large. Therefore when the value of S is selected so as to obtain good correction of the coma aberration, good overall results can be obtained. For this purpose, it is desirable to satisfy the condition of $1 < f \cdot (1/R_1 + 1/R_2) < 1.6$ Beyond the upper limit, the inward coma aberration increases, and on the other hand, below the lower limit, the outward coma aberration increases. In the projection system shown in FIG. 1, flare appears in the image on the object depending on the position of the light source, thus lowering the accuracy of the distance detection. Meanwhile, in the case of the receiving system, flare appears in the image on the receiving element.

Figure 7:
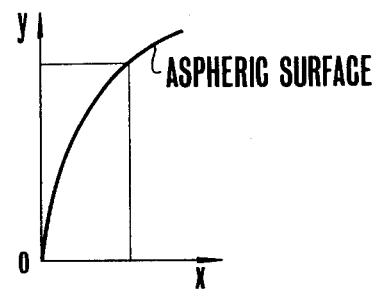
FIG. 7 shows a cross section of an aspherical lens.
Figure 8A:
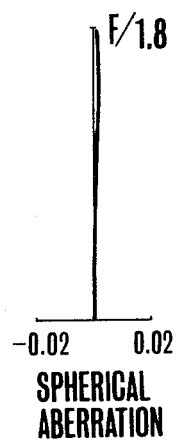
FIGS. 8A to 8D, FIGS. 9A to 9D, FIGS. 10A to 10D, FIGS. 11A to 11D, and FIGS. 12A to 12D show various aberrations of lenses having aspherical surfaces corresponding to Examples 1 to 5, below.
Figure 8B:
Figure 8C:
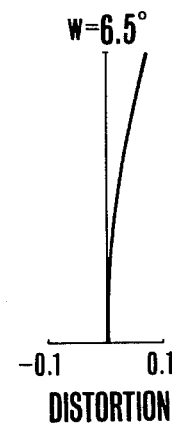
Figure 8D:
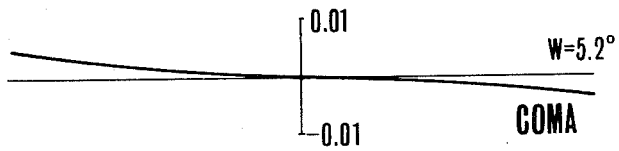
Figure 9A:
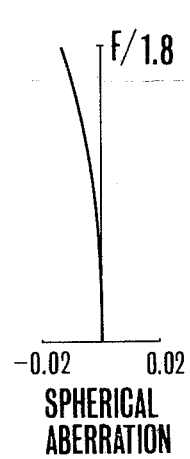
Figure 9B:
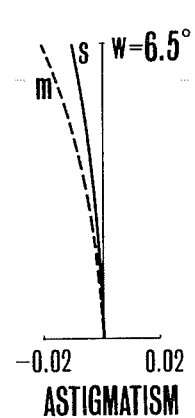
Figure 9C:
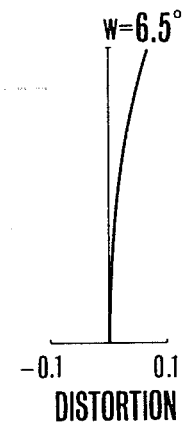
Figure 9D:
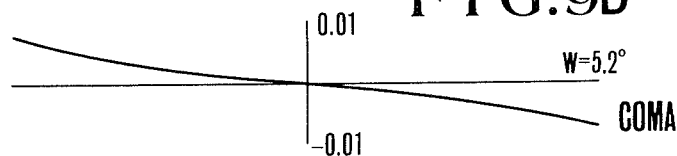
Figure 10A:
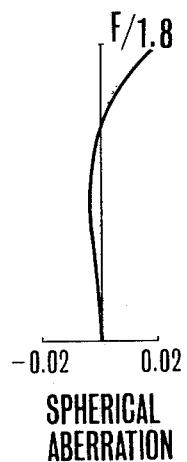
Figure 10B:
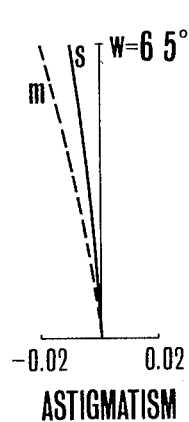
Figure 10C:
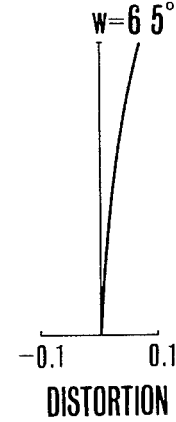
Figure 10D:
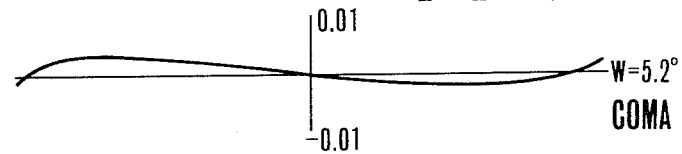
Figure 11A:
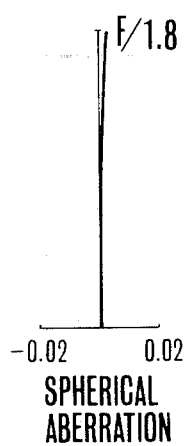
Figure 11B:
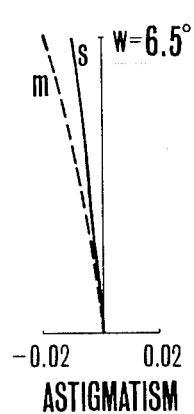
Figure 11C:
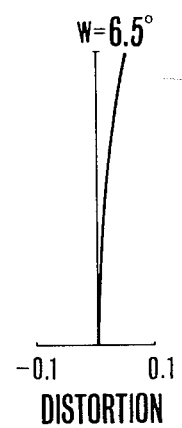
Figure 11D:
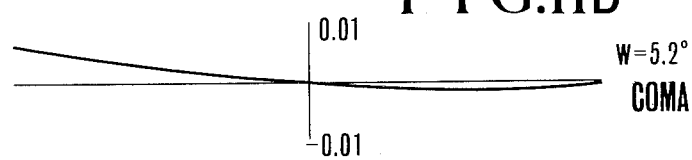
Figure 12A:
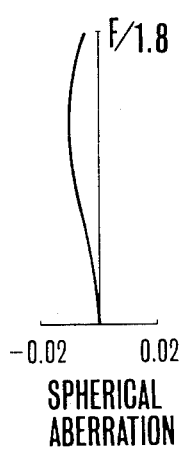
Figure 12B:
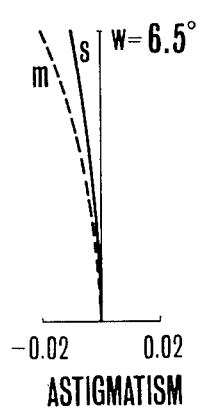
Figure 12C:
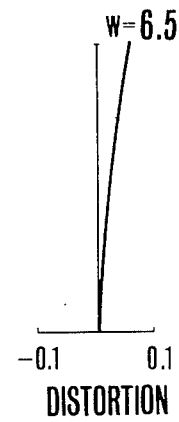
Figure 12D:
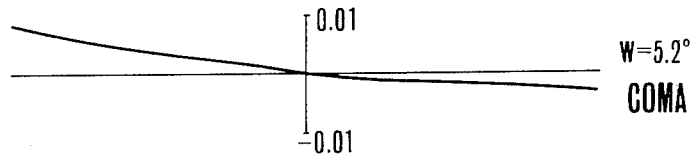

For correction of the spherical aberration, almost equal results can be obtained by introducing the aspherical surface to the first surface or the second surface of the lens. As shown in FIG. 7, the optical axis of the aspherical shape extends along the x axis, and the vertical direction to the optical axis is taken along the y axis. The curvature around the optical axis of the surface (paraxial region) to which the aspherical surface is introduced is R, and thus $$x = R \left\{ 1 - \left( 1 - \frac{y^2}{R^2} \right)^{\frac{1}{2}} \right\} + By^4 + Cy^6$$

When the first surface is to be aspherical, $B<0$; and when the second surface is to be aspherical $B>0$, and the following condition should be preferably satisfied:

$0.45/f^3 < |B| < 0.75/f^3$

Beyond the upper limit of the above condition, the positive spherical aberration becomes excessive, while below the lower limit, the negative spherical aberration becomes excessive, and thus unsatisfactory for either of the projection lens and the receiving lens.

Further, for correction of the spherical aberration, it is effective to maintain both the conditions of $B \neq 0$ and $C \neq 0$, and when the first surface is to be aspherical, C should be $C<0$, and when the second surface is to be aspherical, C should be $C>0$, and the following condition should be satisfied:

$1.2/f^5 < |C| < 2.6/f^5$

Beyond the upper limit of the condition, the positive zonal spherical aberration becomes excessive, and on the other hand, below the lower limit, the negative zonal spherical aberration becomes excessive, and thus disadvantageous for either of the projecting lens and the receiving lens.

Numerical examples for the present invention will be set forth below. In these examples the maximum picture angle is set to be 6.5°. The light flux from the projection light source 1 in FIG. 1 is projected onto an infinite distant object, and the reflected light from the object falls on the optical axial position of the light receiving plane. At this time, if the close-up distance is 0.7 m from the principal point of the lens 6, the base length for a maximum picture angle of 6.5° is about 80 mm, which is satisfactorily long.

In the tables set forth hereinbelow, r is the curvature radius of the lens sumit, d is the lens thickness, N is the refraction rate of the material, and the numerical order of the lens surfaces is counted from the object side. The focal length f of the lens is in normalized units.

EXAMPLE 1

Focal length f=1 (wavelength λ=860 nm)

| Surface Number | r | d | $N(\lambda = 860 \text{ nm})$ | $N(\lambda = 810 \text{ nm})$ |
|---|---|---|---|---|
| 1 | 0.5602 | | | |
| | | 0.1814 | 1.48519 | 1.48616 |
| 2 | −3.2395 | | | |

$$f \cdot \left( \frac{1}{R_1} + \frac{1}{R_2} \right) = 1.476$$

The first or second surface of the above lens is made aspherical, and B and C are the aspherical coefficients.

| Example | Aspherical | B | C | Aberration Coefficient | Aberration graph |
|---|---|---|---|---|---|
| 1-1 | r1 | −0.5465 | −1.6667 | Table 1 | FIGS. 8A-D |
| 1-2 | r1 | −0.4822 | −1.3126 | Table 2 | FIGS. 9A-D |
| 1-3 | r2 | −0.6966 | −2.5 | Table 3 | FIGS. 10A-D |

TABLE 1
(Example 1-1)

| Numerical order of surfaces | SA | CM | AS | DS |
|---|---|---|---|---|
| 1 | −0.870265 | 0.700862 | 0.392636 | 0.546648 |
| 2 | 0.884314 | −0.654205 | 0.483973 | −0.432642 |
| Total | 0.014049 | 0.046657 | 0.876609 | 0.114006 |

SA: Spherical Aberration Coefficient
CM: Coma aberration coefficient
AS: Astigmatism coefficient
DS: Distortion coefficient

TABLE 2
(Example 1-2)

| Numerical order of surfaces | SA | CM | AS | DS |
|---|---|---|---|---|
| 1 | −0.620698 | 0.700862 | 0.392636 | 0.546648 |
| 2 | 0.884314 | −0.654205 | 0.483973 | −0.432642 |
| Total | 0.263615 | 0.046657 | 0.876609 | 0.114006 |

TABLE 3
(Example 1-3)

| Numerical order of surfaces | SA | CM | AS | DS |
|---|---|---|---|---|
| 1 | 1.251050 | 0.700862 | 0.392636 | 0.546648 |
| 2 | −0.844252 | −0.890354 | 0.451712 | −0.437048 |
| Total | 0.406797 | −0.189492 | 0.844348 | 0.109598 |

EXAMPLE 2

Focal length f=1 (wavelength λ=860 nm)

| Surface Number | r | d | $N(\lambda = 860 \text{ nm})$ | $N(\lambda = 810 \text{ nm})$ |
|---|---|---|---|---|
| 1 | 0.6043 | | | |
| | | 0.1814 | 1.48519 | 1.48616 |
| 2 | −2.22 | | | |

-continued

| Surface Number | r | d | $N\left(\lambda = 860\text{ nm}\right)$ | $N\left(\lambda = 810\text{ nm}\right)$ |
|---|---|---|---|---|

$$f \cdot \left(\frac{1}{R_1} + \frac{1}{R_2}\right) = 1.204$$

| Example | Aspherical | B | C | Aberration coefficient | Aberration graph |
|---|---|---|---|---|---|
| 2-1 | r1 | −0.5334 | 1.5512 | Table 4 | FIG. 11 |
| 2-2 | r2 | 0.5334 | 1.5512 | Table 5 | FIG. 12 |

TABLE 4

(Example 2-1)

| Numerical order of surfaces | SA | CM | AS | DS |
|---|---|---|---|---|
| 1 | −1.073756 | 0.602369 | 0.364003 | 0.546648 |
| 2 | 1.134089 | −0.740482 | 0.483484 | 0.411764 |
| Total | 0.060333 | −0.138113 | 0.847487 | 0.134884 |

TABLE 5

(Example 2-2)

| Numerical order of surfaces | SA | CM | AS | DS |
|---|---|---|---|---|
| 1 | 0.996827 | 0.602369 | 0.364003 | 0.546648 |
| 2 | −0.235145 | −0.926242 | 0.458282 | −0.415183 |
| Total | 0.761683 | −0.323873 | 0.822285 | 0.131465 |

Various aberration conditions of the lens according to the present invention are as shown in FIG. 8A to FIG. 12D, from which it is clearly shown that far improvements are obtained as compared with the aberration shown in FIGS. 6A–6D.

Particularly in the case of the differential type in which the output difference between the light receiving elements is used as the distance detection signal, it is possible to produce a clear and highly bright image of the projected light on the object by a single structure when the aspherical lens according to the present invention is used as the projecting lens, and similarly it is possible to produce a clear and highly bright reflected image of the distance detecting light beam image, namely the projected light image on the light receiving element by a simple structure when the aspherical lens is used as the receiving lens. By the functions of both aspherical surfaces, the changes of $I_4$ and $I_5$ in FIG. 2, as well as the change of $I_7$ in FIG. 4, become quite sharp and thus can be used as a good distance detecting signal.

While specific embodiments of the invention have been shown and described in detail to illustrate the application of the inventive principles, it will be understood that the invention may be embodied otherwise without departing from such principles.

What is claimed is:

1. A range detecting device which determines the distance from the device to an outside object, said device comprising:
   (a) a light emitting source;
   (b) a first lens system including a number of lens surfaces having a common optical axis for projecting a light beam from said light emitting source toward the object, at least one of said lens surfaces being curved and aspherical for correcting aberration of a projected area of said light beam;
   (c) a second lens system including a number of lens surfaces for receiving reflected light from the object; and
   (d) reflected light sensing means for producing an output signal indicative of the light received by the second lens system; the curvature of said aspherical surface of said first lens system decreasing relative to the distance of said aspherical surface from the optical axis for correcting spherical aberration, wherein said aspherical surface satisfying the following conditions:

$$x = R\left\{1 - \left(1 - \frac{y^2}{R^2}\right)^{\frac{1}{2}}\right\} + By^4 + Cy^6$$

wherein x represents the optical axis direction, y represents the direction perpendicular to the x direction, and R represents curvature around the optical axis and $$0.45/f^3 < |B| < 0.75/f^3,\ 1.2/f^5 < |C| < 2.6/f^5$$

wherein the first lens system includes at least a lens having an aspherical surface and f is the focal length of the lens having the aspherical surface.

2. A range detecting device which determines the distance from the device to an outside object, said device comprising:
   (a) a light emitting source;
   (b) a first lens system including a number of lens surfaces having a common optical axis for projecting a light beam from said light emitting source toward the object, at least one of said lens surfaces being curved and aspherical for correcting aberrations of a projected area of said light beam;
   (c) a second lens system including a number of lens surfaces for receiving reflected light from the object; and
   (d) reflected light sensing means for producing an output signal indicative of the light received by the second lens system; said first lens system comprising a single lens, and satisfying the following condition:

$$1 < f(1/R_1 + 1/R_2) < 1.6$$

wherein f is the focal length of the single lens, $R_1$ and $R_2$ are curvatures of both surfaces of the single lens for determining the focal length.

* * * * *